(12) United States Patent
Baldwin

(10) Patent No.: US 9,086,318 B1
(45) Date of Patent: Jul. 21, 2015

(54) TRANSMISSIVE BARRIER IN A TRANSMISSIVE SHEET

(71) Applicant: Amazon Technologies, Inc., Reno, NV (US)

(72) Inventor: Leo Benedict Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 95 days.

(21) Appl. No.: 13/895,243

(22) Filed: May 15, 2013

(51) Int. Cl.
*H04N 5/225* (2006.01)
*G01J 1/04* (2006.01)
*H04N 5/235* (2006.01)

(52) U.S. Cl.
CPC ............... *G01J 1/04* (2013.01); *H04N 5/2252* (2013.01); *H04N 5/2256* (2013.01); *H04N 5/2259* (2013.01); *H04N 5/2354* (2013.01)

(58) Field of Classification Search
CPC .. H04N 5/2256; H04N 5/2259; H04N 5/2354
USPC .................................. 348/370, 371
See application file for complete search history.

(56) References Cited

U.S. PATENT DOCUMENTS

| | | | |
|---|---|---|---|
| 3,816,117 A * | 6/1974 | Kaukeinen | 430/67 |
| 2003/0227547 A1 * | 12/2003 | Iddan | 348/151 |
| 2005/0094410 A1 * | 5/2005 | Stephan et al. | 362/510 |
| 2005/0141847 A1 * | 6/2005 | Schroeder et al. | 385/147 |
| 2006/0202125 A1 * | 9/2006 | Suhami | 250/368 |
| 2008/0111949 A1 * | 5/2008 | Shibata et al. | 349/64 |
| 2009/0002545 A1 * | 1/2009 | Heinonen et al. | 348/370 |
| 2009/0153729 A1 * | 6/2009 | Hiltunen et al. | 348/371 |
| 2011/0043919 A1 * | 2/2011 | Ko et al. | 359/592 |
| 2012/0018323 A1 * | 1/2012 | Johnson et al. | 206/320 |
| 2012/0075191 A1 * | 3/2012 | Yang et al. | 345/168 |
| 2013/0314582 A1 * | 11/2013 | Masser | 348/340 |
| 2014/0132818 A1 * | 5/2014 | Meierling | 348/335 |

* cited by examiner

*Primary Examiner* — Nicholas Giles
*Assistant Examiner* — Abdelaaziz Tissire
(74) *Attorney, Agent, or Firm* — Novak Druce Connolly Bove + Quigg LLP

(57) ABSTRACT

Approaches enable a component such as a camera of a computing device to be collocated, or otherwise placed in proximity under the same cover sheet of material with an light source. A cover sheet can include a transmissive barrier positioned therein. The transmissive barrier can include at least one of a light scattering or light blocking feature. A light source and camera sensor can be positioned on a same side of the cover sheet and the transmissive barrier can be positioned between the light source and the camera such that light reflected from the light source by a portion of the cover sheet towards the camera is at least scattered, refracted, diffracted, blocked, or otherwise reduced using a determined pattern, layer, or other such feature in order to reduce an amount of light of the light source that is reflected from a surface or feature of the cover sheet and is detected by the camera.

18 Claims, 5 Drawing Sheets

- Side Cross Section -

- Side Cross Section View -

- Front Cross Section View -

- Side Cross Section View -

- Front Cross Section View -

- Side Cross Section View -

TRANSMISSIVE BARRIER IN A TRANSMISSIVE SHEET

BACKGROUND

People are increasingly interacting with computers and other electronic devices in new and interesting ways. For example, mobile devices are increasingly offering multiple high quality cameras that enable additional types of functionality. Often, these cameras are positioned with a light source behind their own protective glass sheet and are separated at a distance far enough from one another to prevent feedback from the light source into any one of the cameras. Often times, however, it can be desirable to have the camera and light source positioned behind the same glass sheet for esthetic or other reasons. Additionally, it can be desirable to position the camera in close proximity to the light source under the same cover sheet without having light from the light source feedback to the camera.

BRIEF DESCRIPTION OF THE DRAWINGS

Various embodiments in accordance with the present disclosure will be described with reference to the drawings, in which.

DETAILED DESCRIPTION

Figure 1A:
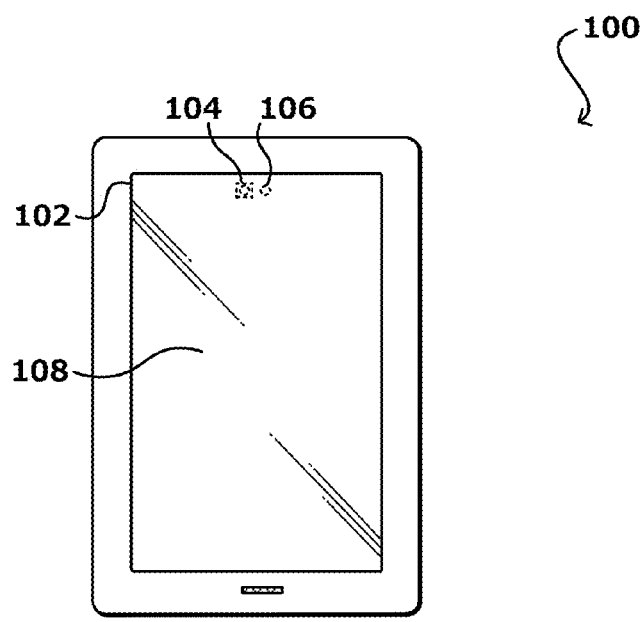
FIGS. 1(a) and 1(b) illustrate a situation of light piping between a camera and a light source positioned on a same side of a cover sheet in accordance with various embodiments.

Systems and methods in accordance with various embodiments of the present disclosure may overcome one or more of the aforementioned and other deficiencies experienced in conventional approaches to capturing an image using an electronic device. In particular, various embodiments enable a component such as at least one camera or camera sensor of a computing device (e.g., a mobile phone, tablet computer, etc.) or other electronic device to be collocated, or otherwise placed in proximity under the same cover sheet of material with an illumination source, which can interfere or otherwise degrade image capture quality of the camera(s). Approaches enable cameras (or other illumination sensors) and illumination sources to operate behind, or otherwise from the same side of, the same sheet of material by reducing an amount of light that reaches the cameras.

For example, in accordance with various embodiments, a cover sheet (e.g., a cover can include a transmissive barrier (also referred to as a light filtering feature) positioned therein. The transmissive barrier can include at least one of a light scattering pattern or light blocking feature. A light source and camera can be positioned on a same side of the cover sheet and the transmissive barrier can be positioned between the light source and the camera. In some instances, when the light source and camera are in operation (e.g., the camera is being used to capture an image and the light source is being used to provide light), a majority of the light emitted from the light source passes relatively straight through the cover sheet. However, in many instances, at least a portion the light emitted from the light source can reflect off the top surface (or other features) of the cover sheet towards the camera, which can degrade the quality of images captured by the camera. Accordingly, in accordance with various embodiments, a transmissive barrier can be positioned between the light source and the camera such that light reflected from the light source by a portion of the cover sheet towards the camera is at least scattered, refracted, diffracted, blocked, or otherwise reduced using a determined pattern, layer, or other such feature in order to reduce an amount of light of the light source that is reflected from a surface or feature of the cover sheet and is detected by the camera. In various embodiments, a scattering pattern includes a plurality of refractive features configured in a particular arrangement, such a uniform arrangement of features or a random arrangement of features. Light entering the scattering pattern, such as light reflected by the cover sheet, is scattered by the refractive features to reduce an amount of light detected by the camera that was reflected by the cover sheet. In other embodiments the transmissive barrier includes a blocking feature configured to block an amount of light from reaching the camera. Various other applications, processes, and uses are presented below with respect to the various embodiments.

Figure 1B:
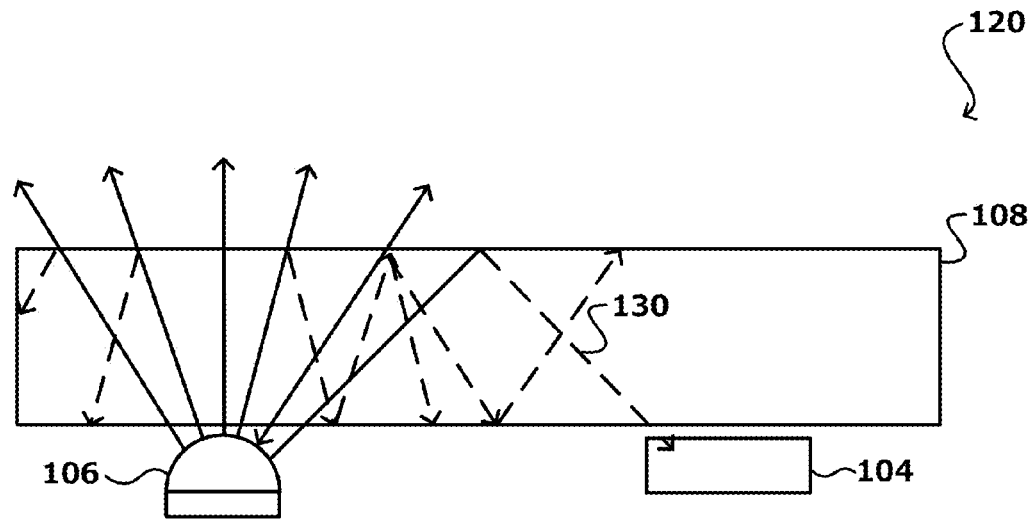

FIGS. 1(a) and 1(b) illustrate a situation of light piping between a camera and a light source positioned on the same side of the same cover sheet. As illustrated in FIG. 1(a), a computing device 100 includes a display screen 102, a camera 104, and a light source 106. The camera (also referred to as a sensor or camera sensor) can be a high or low-resolution camera that can include auto-focusing elements for use in still image capture or two-dimensional video capture, and can be, for example, a camera including a complimentary metal-oxide semiconductor (CMOS) device, a motion detection sensor, a charge coupled device (CCD), an infrared sensor, a quantum dot imager, a gallium arsenide sensor, or any other appropriate image capturing technology. The light source (also referred to as an illumination element) can be a white light LED, or other such illumination element, useful in illuminating objects within at least a portion of a field of view of the camera. The device can include other elements useful for imaging as well, such as a light sensor for determining an amount of ambient light.

Covering the display screen, for example, can be a cover sheet 108. The cover sheet can be made from any number of materials, such as an alkali-aluminosilicate sheet glass, borosilicate glass, high-impact polymer such as polycarbonate, synthetic sapphire, or some other cover sheet made from one or more materials known in the art. The cover sheet can be formed to have different shapes and/or thicknesses. Example shapes can include a rectangular shape or a round shape. The cover sheet can have beveled, rounded, or straight edges. The thickness can be any thickness. For example, the thickness of the cover sheet can be in the range of 0.1 mm to 1.0 mm; however, other thicknesses are possible. While the device in this example is a portable computing device, such as a smart phone, tablet computer, or personal data assistant, it should be understood that any appropriate computing or electronic device can take advantage of aspects of the various embodiments, as may include personal computers, set top boxes, smart televisions, video game systems, vehicles, machinery, and the like. Further, while the cameras in this example are "front-facing" cameras, as may be used for purpose such as video conferencing, it should be understood that "rear-facing" cameras or cameras in other locations or orientations can be used as well within the scope of the various embodiments.

When the light source is active, light is emitted over a range of forward directions that cover a range of angles around an axis normal to the light source. For example, as shown in FIG. 1(b), light is emitted from the light source 106 in a range of forward directions. The light emitted from the light source can reflect off at least a portion of the top surface of the cover sheet (or other features of the cover sheet such as the bottom surface), can be refracted by the cover sheet where a portion of the light passes through the cover sheet and a portion of the light reflects off the cover sheet, or can pass through the cover sheet. As used herein, the original ray emitted from the light source is the incident ray, and after reflection, it is the reflected ray. The angles of the incident and reflected rays are measured from the normal, where the normal is a line perpendicular to the surface at the point where the incident ray reflects. The incident ray, reflected ray, and normal all lie in the same plane perpendicular to the reflecting surface, known as the plane of incidence. The angle measured form the incoming ray to the normal is termed the incident angle. The angle measured from the outgoing ray to the normal is called the reflected angle, and the angle of incidence equals the angle of reflection.

Refraction is the bending of light when the ray passes from one transparent medium to another, such as in example 120 illustrated in FIG. 1(b), where the light passes from the cover sheet to the outside environment. This meeting place of two different media is called the interface between the media, and all refraction of light (and reflection) occurs at the interface. A transparent object, such as the cover sheet 108, can allow the transmission of light, in contrast to an opaque object which does not. Some of the light can also be reflected by the cover sheet. Light reflected from the cover sheet can be partially polarized (e.g., primarily polarized). A ray incident on a transparent surface at a certain angle can be partly refracted and partly reflected in a plane polarized ray.

At certain angles (e.g., when the incident angle is at a critical angle), all of the light emitted from the light source is reflected by the cover sheet. This is termed total internal reflection. Light with an incident angle less than the critical angle is partly refracted and partly reflected and light with an incident angle greater than the critical angle is reflected. As shown in FIG. 1(b), at least a portion of the light emitted from the light source passes through the surface of the cover sheet and is not reflected. As the light propagates, at least a portion of the light is reflected. That is, the light incident at the cover sheet includes a transmitted component of the light (that which goes through the cover glass) and another component of the light that is reflected at the surface. When the incident angle of the emitted light is greater than the critical angle, the light is reflected by the surface of the cover sheet. In some instances, however, at least a portion of the light 130 is refracted and/or reflected into the camera, which can degrade the quality of images captured by the camera. In accordance with various embodiments, it can be desirable to position the camera in close proximity to the light source under the same cover sheet without having light from the light source feedback to the camera for both aesthetic and operational considerations.

Figure 2:
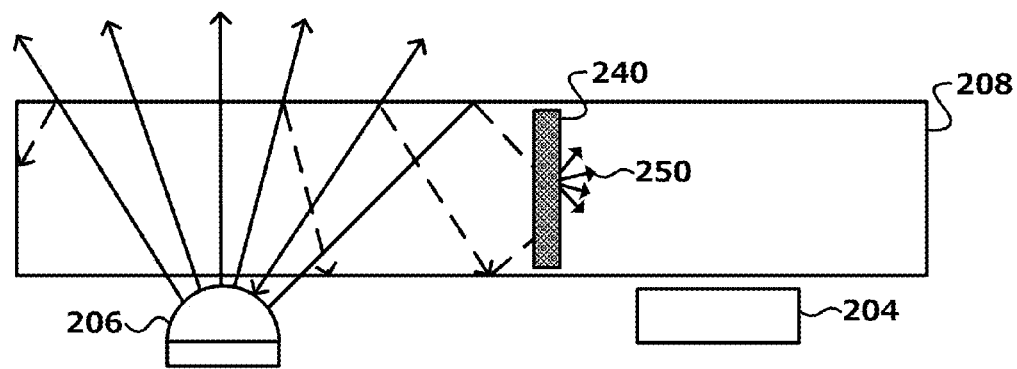
FIG. 2 illustrates a situation where a transmissive barrier is positioned between a light source and a camera on a same side of a cover sheet in accordance with an embodiment.

Accordingly, in accordance with various embodiments, a transmissive barrier can be positioned between the light source and the camera such that light reflected from the light source by a portion of the cover sheet towards the camera is at least scattered, refracted, diffracted, blocked, or otherwise reduced using a determined pattern, layer, or other such feature in order to reduce an amount of light of the light source that is reflected from a surface or feature of the cover sheet and is detected by the camera. For example, situation 200 in FIG. 2 illustrates the situation where a transmissive barrier 240 is positioned within a cover sheet 208 between a light source 206 and a camera 204 in accordance with an embodiment. In this situation, light refracted and/or reflected by the upper surface of the cover sheet towards the camera is caused to be scattered and/or diffused 250 by one of a scattering pattern or a diffusion pattern of the transmissive barrier in order to reduce an amount of light that reaches the camera. As described, an example scattering pattern can include a plurality of refractive features configured in an arrangement or pattern. The pattern can be regular or random. Light entering the scattering pattern, such as light reflected by the cover sheet, is scattered by the refractive features. The patterns can be, for example, 2D or 3D array patterns (e.g., refractive patterns), where, based at least in part on the relationship between the size and placement of the patterns to the wave length of the reflected light, the patterns can refract and/or diffract the reflected light. The orientation or arrangement of the patterns can be regular (e.g., uniform, such as in the situation of using a parallel gratings), where the pattern can include dots or circles arranged in rows, columns, or some other orientation at a determined density. Alternatively, the structure of the patterns can be irregular, where the pattern, spacing and/or density of the pattern can vary.

Figure 3A:
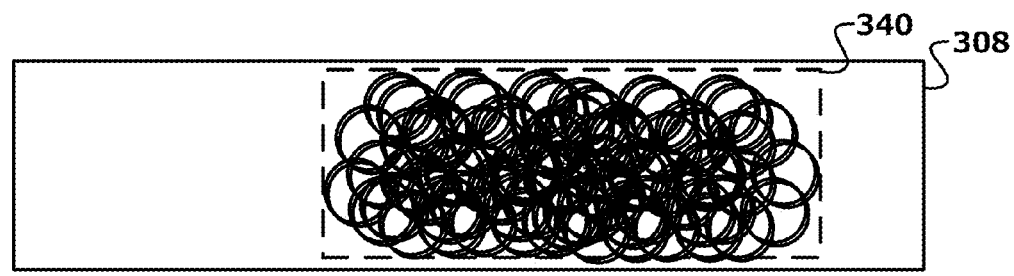
FIGS. 3(a) and (b) illustrate example views of a transmissive barrier in accordance with various embodiments.

A diffusion pattern of the transmissive barrier can be used to, for example, diffuse light emitted by the light source that is reflected by the top surface of the cover sheet in order to reduce an amount of light that reaches the camera. For example, the diffusion pattern can increase the range of angles that the light reflected by the top surface of the cover sheet propagates such that the amount of light that is in a direction that could enter the camera is decreased and is instead diverted into other directions. In accordance with various embodiments, different diffusion patterns can be used to diffuse the reflected light. One such pattern can include spheres, circles, bubbles, dots, or other such patterns such as those shown in FIG. 3(a). In many situations the patterned features can overlap. In this example, a front cross section view of the diffusion pattern is shown, which illustrates a plurality of overlapping spheres. The diameter of the spheres can be, for example, around 20 um and the center of each sphere can be spaced, for example, around 10 um from the center of a neighboring sphere. Other diameter and spacing measurements are possible in accordance with various embodiments. The number of spheres used to create a diffusion pattern is based at least in part on a threshold of acceptable light that can reach the camera. Too few overlapping spheres and an amount of light that reaches the camera will be above the threshold. Thus, the number of spheres used is the number of spheres required to reduce the amount of light that reaches the camera to be below the threshold. It should be noted that other patterns can be used and the patterns described and illustrated herein to reduce an amount of light that reaches the camera are for illustrative purposes. The arrangement, type of pattern, density of pattern, etc., can be adjusted such that the light that reaches the camera is below a desired threshold level of light.

Figure 3B:
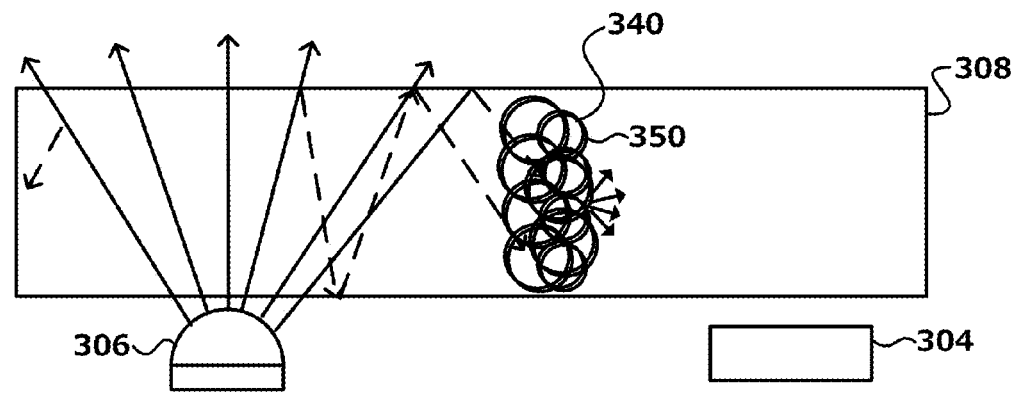

FIG. 3(b) illustrates a side cross section view of the diffusion pattern. The diffusion pattern can span the entire width of the cover sheet, e.g., from the top surface of the cover sheet to the bottom surface of the cover sheet. In other embodiments, the diffusion pattern can span a portion of the width of the cover sheet, where the portion of the cover sheet can be adjusted such that the light that reaches the camera is below a threshold level of light. Further still, the diffusion pattern can span different portions of the width of the cover sheet. It should be understood that although the diffusion pattern is shown as a relatively vertical line, the diffusion pattern can be a formed in a, an arch, a sphere, or any other pattern.

As described, a transmissive barrier can be positioned within a cover sheet between a light source and a camera, where light refracted and/or reflected by the upper surface of the cover sheet towards the camera is caused to be scattered and/or diffused by one of a scattering pattern or a diffusion pattern of the transmissive barrier in order to reduce an amount of light that reaches the camera. As described, these patterns, for example, can be 2D or 3D array patterns (e.g., refractive patterns), where, based at least in part on the relationship between the size and placement of the patterns to the wave length of the reflected light, the patterns can refract and/or diffract the reflected light. The orientation or arrangement of the patterns can be regular (e.g., uniform, such as in the situation of using a parallel gratings), where the pattern can include dots or circles arranged in rows, columns, or some other orientation at a determined density. Alternatively, the structure of the patterns can be irregular, where the pattern, spacing and/or density of the pattern can vary.

Figure 4:
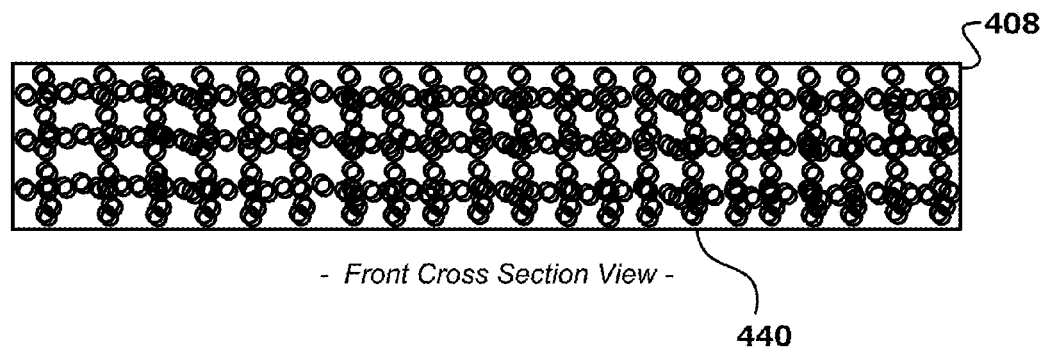
FIG. 4 illustrates an example transmissive barrier in accordance with an embodiment.

For example, FIG. 4 illustrates a front cross section view of an example transmissive barrier used to diffract light, in accordance with an embodiment. As shown, the cover sheet 408 includes a transmissive barrier. In this example, the transmissive barrier includes a diffraction pattern 440, such as a plurality of at least partially overlapping refractive features configured to scatter light reflected by the cover sheet. As described, in some situations the diffraction pattern 440 can include a periodic structure that can split and diffract light into several beams travelling in different directions. The directions of the beams can depend on the spacing of the pattern and the wavelength of the light, the number of layers of a diffraction pattern, among other such factors. For example, the diffraction pattern 440 can be made up of a set of gratings of lines (or other features) of spacing "d" that can be wider than the wavelength of interest to cause diffraction. For a plane wave having a particular wavelength with normal incidence (perpendicular to the grating), each slit in the grating acts as a quasi-point-source from which light propagates in all directions, and after light interacts with the grating, the diffracted light is composed of the sum of interfering wave components emanating from each slit in the grating. At any given point in space through which diffracted light may pass, the path length to each slit in the grating can vary. Since the path length varies, generally, so will the phases of the waves at that point from each of the slits, and thus will add or subtract from one another to create peaks and valleys, through the phenomenon of additive and destructive interference. When the path difference between the light from adjacent slits is equal to half the wavelength, the waves will all be out of phase, and thus will cancel each other to create points of minimum intensity. It should be noted that, in this example, the diffraction pattern 440 includes parallel-aperture gratings. However, in many embodiments, other 2D regular and irregular arrays of features can be used to diffract and/or deflect light. For example, in many embodiments, the diffraction pattern 440 is determined such that an intensity minima (i.e., the described destructive interference) occurs proximate to the camera and intensity maxima (e.g., the complementary areas where the light comes together substantially in phase) are determined to occur in areas calculated to not enter the camera.

As described, the diffraction pattern 440 can include a set of parallel lines and/or features at a determined spacing and orientation. Additionally, the diffraction pattern 440 can include 2D regular and irregular arrays of features. Further, the features of the diffraction pattern 440 can be arranged in multiple different (or similar) orientations and patterns. In another example, the diffraction pattern 440 can include at least two sets of diffraction features (e.g., lines), such as a first set of diffraction features at a first angle and a second set of diffraction features at second angle, where the second set of features can be positioned behind (or in front) of the first set of features. The distance between the first set of features and the second set of features can be spaced around the wavelength of the light coming from the light source. In the situation where one set of features is used, the spacing between the features in the set of features is at an orientation appropriate for the polarization of the light reflected from the top surface of the cover sheet. In the situation where at least two sets of features are used, each set of features can be separated by a determined distance. In this situation, the light reflected from the top surface of the cover sheet can be diffracted independent of the polarization of the light. Such an arrangement is illustrated in FIG. 4, which shows a front cross section view of a first set of diffraction features on a first layer having a first orientation separated by a determined distance from a second set of features on a second layer having a second orientation. When light is emitted from the light source, the light reflected from the top surface of cover sheet towards the camera is diffracted by the first set of features on the first layer, and the diffracted light is further diffracted by the second set of features on the second layer to reduce an amount of light that reaches the camera. It should be noted that any number of layers can be used. It should be further noted that the features can be at any number of different angles such that the reflected light is diffracted in such a ways as to reduce an amount of light that reaches the camera. The orientation of each feature in a set of features can be the same or different. Further, in many embodiments, other 2D regular and irregular arrays of features can be used to diffract and/or deflect light, where the structure of these patterns can be irregular such as by varying the spacing, density, and/or diffraction pattern, or regular such as a set of equal distant lines each at a determined orientation.

Figure 5:
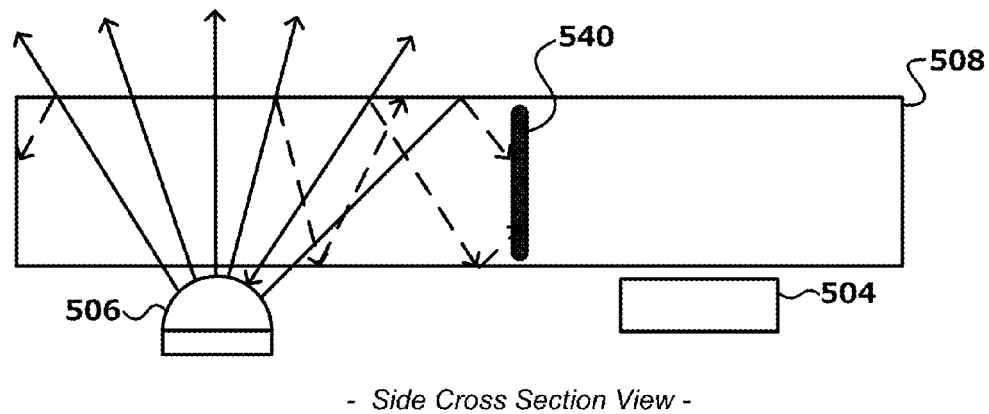
FIG. 5 illustrates an example transmissive barrier, in accordance with an alternate embodiment.

As described, a blocking feature 540 can be used to prevent at least a subset of light reflected off the top surface of the cover sheet from reaching the camera. For example, FIG. 5 illustrates a side cross section view of a cover sheet 508 that includes blocking feature 540. As illustrated, the cover sheet includes a blocking feature 540 positioned between a light source 506 and a camera 504. The blocking feature 540 is positioned such as to prevent light reflected from at least a portion of the top surface of the cover sheet from reaching the camera. The light can be blocked in a number of different ways, such as by reflecting the light or absorbing the light. The blocking feature 540 can span the entire width of the cover sheet, a portion of the width of the cover sheet, or can span certain areas of the width of the cover sheet.

The blocking feature 540 can be formed in the cover sheet in a number of different ways. In one such approach, at interface is formed between two pieces of cover sheet and the blocking feature 540 is positioned within the interface. For example, a first and a second cover sheet can be fused together, where the top surface of each cover sheet is fused together as a single piece and the two pieces of the cover sheet below the top surface are not fused together. In the area where the two pieces of cover sheet are not fused together, an interface is formed, and a blocking or reflective element can be positioned within the interface. Accordingly, when light emitted from the light source reflects and/or refracts from the top surface of the cover sheet towards the camera, at least one of the blocking or reflecting element can prevent the light from reaching the camera.

Figure 6:
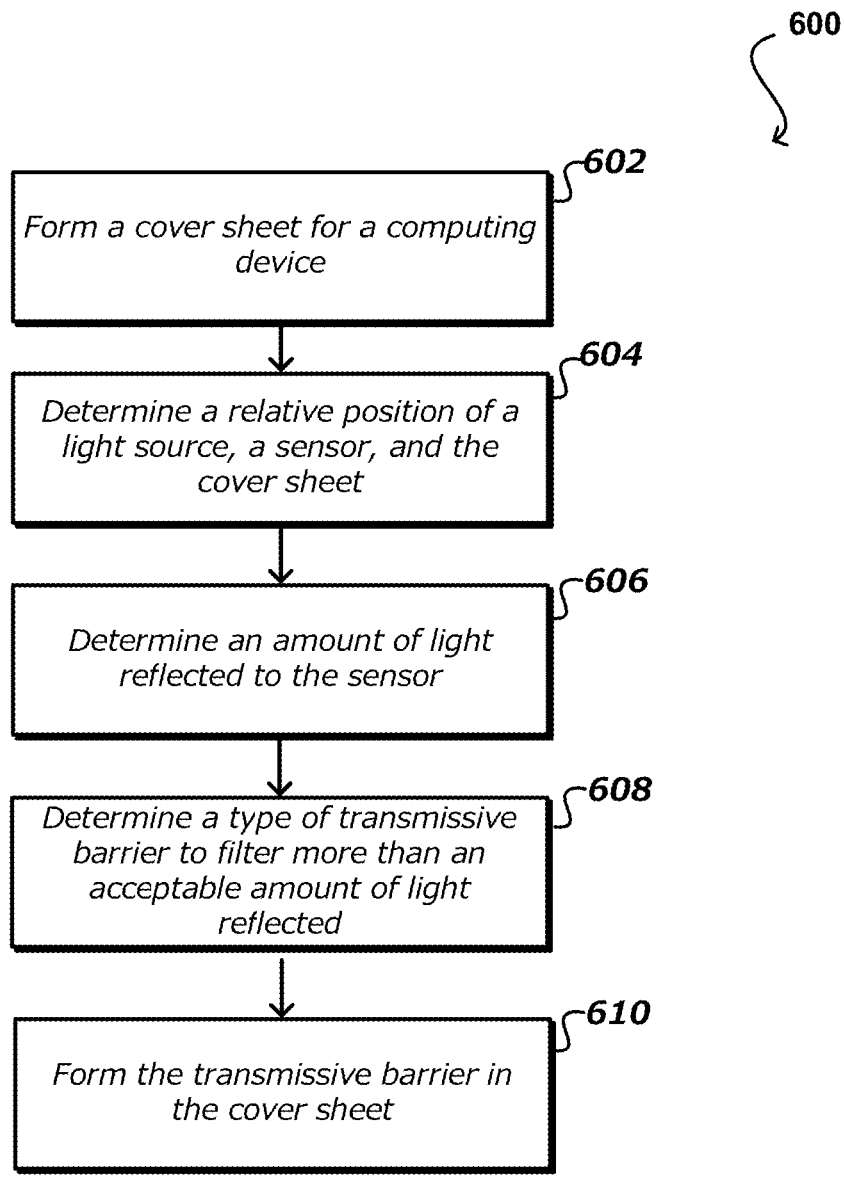
FIG. 6 illustrates an example process for forming a transmissive barrier in accordance with various embodiments.

FIG. 6 illustrates an example process for forming a transmissive barrier or other light filtering feature in a cover sheet, in accordance with various embodiments. It should be understood that, for any process discussed herein, there can be additional, fewer, or alternative steps performed in similar or alternative orders, or in parallel, within the scope of the various embodiments unless otherwise stated. A cover sheet for a display of a computing device is formed 602. The cover sheet can be formed from one of any number of materials, such as glass, plastic, etc. As described, the cover sheet can be formed into different shapes and/or thicknesses. Example shapes include rectangular, oval, or round. The cover sheet can include beveled, rounded, or straight edges. The thickness of the cover sheet can be any thickness. For example, the thickness of the cover sheet can be in the range of 0.1 mm to 1.0 mm or some other thickness. The cover sheet can be used on any appropriate computing or electronic device, as may include personal computers, set top boxes, smart televisions, video game systems, vehicles, machinery, mobile devices, wearable computers (e.g., wrist watches, glasses, etc.), and the like.

A relative position of a light source, a sensor, and the cover sheet is determined 604 when the cover sheet is installed on the computing device. This can include determining a location of the light source and a location of the camera, and a location of the cover sheet. As described, the light source can be a white Xenon flash tube, a white LED, an infrared (IR) emitter such as one used as a proximity or gesture detector, a structured light laser, a pulsed LED laser, IR time-of-flight proximity sensor, light from a display element, light from a dashboard, or any other illumination source.

The light source can be caused to emit light through the cover sheet. As described, light emitted from the light source is emitted over a range of angles. For example, a first direction can be along an axis normal to the light source through the cover sheet. A majority of the light emitted in this direction passes relatively straight through the cover sheet. However, in many instances, at least a portion the light emitted from the light source is reflected off the top surface (or other features) of the cover sheet towards the camera in at least a second direction, the second direction being substantially opposite to the first direction. In accordance with various embodiments, substantially opposite can include any direction that is at least partially in a direction opposite the first direction. As such, at least a portion of the light in the second direction can be received at the camera and this portion of light can be determined 606 or measured using one or more light measuring components. Based at least in part on the amount of light received at the camera, a type of transmissive barrier needed to filter more than an acceptable amount of light reflected can be determined 608. As described, the transmissive barrier can include at least one of a light scattering or light blocking feature, and the transmissive barrier can be formed or otherwise positioned between the light source and the camera such that light reflected from the light source by a portion of the cover sheet towards the camera is at least scattered, refracted, diffracted, blocked, or otherwise reduced using a determined pattern, layer, or other such feature in order to reduce an amount of light of the light source that is reflected from a surface or feature of the cover sheet detected by the camera. Thereafter, at least one transmissive barrier is formed 610 into the cover sheet.

The transmissive barrier can include one or more refractive features configured to scatter light or a blocking feature configured to block an amount of light from reaching the camera. In various embodiments, the features can be located proximate to each other. Proximate can include refractive features that are located next to each other or refractive features that are separated by some distance, such as a percentage of the feature size of the refractive feature. For example, refractive features can be separated by a distance that is half the average refractive feature size. It should be noted that various other distances are possible in accordance with embodiments described herein. The refractive features can overlap, where the amount of overlap of each refractive feature with one or more neighboring refractive features can vary from refractive feature to refractive feature. For example, the amount of overlap between refractive features can include refractive features that completely overlap to refractive features that partially overlap, to no overlap between refractive features. This can accordingly be referred to as proximate to overlapping, where some (or all) refractive features are proximate (or separated by some distance) and some (or all) refractive features are overlapping. It should be noted that in some embodiments all refractive features overlap, while in various other embodiments, a subset of the refractive features overlap.

As described, these patterns, can be, for example, 2D or 3D array of refractive patterns, where, based at least in part on the relationship between the size and placement of the patterns to the wave length of the reflected light, can refract and/or diffract the reflected light. The structure of these patterns can be irregular, where the pattern, spacing and/or density of the pattern can vary. Alternatively or additionally, the structure of these patterns can be regular, such as the structure of a grating pattern.

The transmissive barrier can be used to diffuse light emitted by the light source that is reflected by the top surface of the cover sheet in order to reduce an amount of light that reaches the camera. For example, the transmissive barrier can include a diffusion pattern or other scattering pattern configured to diffuse light reflected by the top surface of the cover sheet by scattering the light such that the resulting light intensity of the light is less and not directed in a particular direction. As described, different diffusion patterns can be used to diffuse the reflected light. One such pattern can include at least a plurality of proximate to overlapping refractive features, such as spheres, circles, and/or dots, or other such patterns, formed into a substantially planar pattern orthogonal to a plane of the top surface of the cover sheet. In accordance with an embodiment, to form such a pattern, a laser can be used on already tempered glass (or prior to tempering) to alter the characteristics of the glass to create the pattern, by, for example, creating laser induced damage sites (e.g., cracked glass sites or bubble formations in the glass). In many embodiments, the laser can be configured to create a change in the refractive index of the glass (or other material), where photons of the laser are absorbed by the glass, and the absorption of the photons by the glass generates a refractive index change in the glass. Such a process is commonly referred to as two-photon absorption. As is well known in the art, two-photon absorption is the simultaneous absorption of two photons of identical or different frequencies in order to excite a molecule from one state to a higher energy electronic state. Such approaches can be used for creating refractive index changes in substrates, such as glass or plastic, or any substrate used to form a cover sheet.

In accordance with an embodiment, there are a number of laser parameters that can apply, and include but are not limited to: a green diode-pump solid state (DPSS) laser at 532 nm with a pulse length in the high femtosecond or low-to-mid picosecond range and focused to a spot size of about 2 um (e.g., beam waist 2 um), a UV-laser in the range of 355 nm, and IR lasers of around 1064 nm. In accordance with an embodiment, when forming the laser induced damage site, the laser is focused inside the cover sheet through a 'fast' lens of about 2.0 focal ratio, which allows the spot on the front of the cover sheet to be relatively large (e.g., around 10 um depending on, for example, the focal ratio and the depth of the spot below the surface) and below the damage threshold of the cover sheet but quickly come to focus inside the cover sheet to create the laser damage in the cover sheet. In accordance with various embodiments, the laser damage in the cover sheet can be one or more of: a refractive index change (laser-induced chemical change), a mechanical fracture, or a mechanical bubble formation. A refractive index change is a nonlinear optical effect seen in certain materials, such as the cover sheet described herein (and/or other materials that respond to light), wherein the physical properties of the material are altered such that the material has a different refractive index. In this situation, a transmissive barrier or other spatially varying refractive index pattern can be formed in the material. The refractive index pattern can then diffract or reflect light shone into the material. For example, the transmissive barrier can be positioned between the light source and the camera such that light reflected from the light source by a portion of the cover sheet towards the camera is at least scattered, refracted, diffracted, blocked, or otherwise reduced using a determined pattern, layer, or other such feature in order to reduce an amount of light of the light source that is reflected from a surface or feature of the cover sheet and is detected by the camera.

A laser induced mechanical fracture and a laser induced mechanical bubble include can include thermally damaging the cover sheet to create such a pattern. One such pattern can include a plurality of overlapping spheres. As described, the diameter of the spheres can be, for example, around 2 um and the center of each sphere can be spaced, for example, around 1 um from the center of a neighboring sphere. The number of spheres used to create a diffusion wall is based at least in part on a threshold of acceptable light reached at the camera. Too few overlapping spheres and an amount of light that reaches the camera will be above the threshold. Thus, the number of spheres used is the number of spheres required to reduce the amount of light that reaches the camera to be below the threshold. In accordance with an embodiment, the diffusion pattern can span the entire width of the cover sheet, e.g., from the top surface of the cover sheet to the bottom surface of the cover sheet. In other embodiments, the diffusion pattern can span a portion of the width of the cover sheet, where the portion of the cover sheet can be adjusted such that the light that reaches the camera is below a threshold level of light. Further still, the diffusion pattern can span different portions of the width of the cover sheet.

In accordance with an embodiment, forming the transmissive barrier can include forming a diffraction pattern in the transmissive barrier, the diffraction pattern configured to reduce an amount of light that reaches the camera by diffracting light reflected by the top surface of the cover sheet. As described, the diffraction pattern can include one or more layers or sets of features arranged in a determined (or a varying) orientation. In various embodiments, the features can be formed using lasers, or by some mechanical means, such as air, water, among others. It should be noted that any number of layers can be used. It should be further noted that the transmissive barrier can include a scattering pattern that includes a plurality of proximate to overlapping refractive features configured to scatter light reflected by the cover sheet or a blocking feature configured to block an amount of light from reaching the camera. As described, these patterns, can be, for example, 2D or 3D array of patterns (e.g., refractive patterns), where, based at least in part on the relationship between the size and placement of the patterns to the wave length of the reflected light, can refract and/or diffract the reflected light. The structure of these patterns can be irregular, where the pattern, spacing and/or density of the pattern can vary. Alternatively or additionally, the structure of these patterns can be regular, where the pattern can include dots or circles arranged in rows, columns, or in some other orientation and arranged in a determined density.

In accordance with an embodiment, a blocking feature can be formed into the transmissive barrier. As described, the blocking feature can be used to prevent light reflected off the top surface of the cover sheet from reaching the camera. The blocking feature can be positioned between the light source and the camera. The light can be blocked in a number of different ways, such as by reflecting the light or absorbing the light. The blocking feature can span the entire width of the cover sheet, a portion of the width of the cover sheet, or can span certain areas of the width of the cover sheet. The blocking feature can be formed in the cover sheet in a number of different ways. In one such approach, at interface can be created between two pieces of cover sheet and the blocking feature can be positioned within the interface. Accordingly, when light emitted from the light source reflects and/or refracts from the top surface of the cover sheet towards the camera, at least one of the blocking or reflecting elements can prevent the light from reaching the camera.

In accordance with many embodiments, it may be desirable to consider the impact to the mechanical strength of the cover glass due to creating the transmissive barrier. For example, a transmissive barrier including overlapping laser-induced scattering sites may prove to provide attenuation of at least a portion of the light that would otherwise enter the camera but such laser-induced scattering sites can significantly decrease the mechanical strength of the cover glass as maybe be determined by ball-drop or other shock and vibration testing. Accordingly, a pattern of proximate, rather than overlapping, features can be chosen to preserve the mechanical integrity of the cover glass. In accordance with such embodiments, if one such barrier is inadequate to sufficiently attenuate the amount of light that reaches the camera, a second, or third, or multiple such barriers can be employed until sufficient attenuation is reached. Further, by making the pattern of features proximate and not overlapping, at least a portion of the cover glass is left undisturbed, which advantageously helps to maintain the mechanical integrity of the cover glass.

Similarly, it should be noted that how proximate the transmissive barrier extends to the upper and/or lower surface of the cover glass is also subject to mechanical strength considerations as well as optical attenuation considerations. For example, in many situations, although such transmissive barriers can span from the upper surface to the lower surface of the cover glass to provide for optical attenuation of the reflected light rays, transmissive barriers created in such an arrangement can impact the mechanical integrity of the cover glass, for example, by impacting a compressive skin effect that is responsible for much of the mechanical strength of cover glass. For this reason, multiple barriers can be used to preserve the mechanical integrity of the cover glass and provide adequate optical attenuation.

Figure 7:
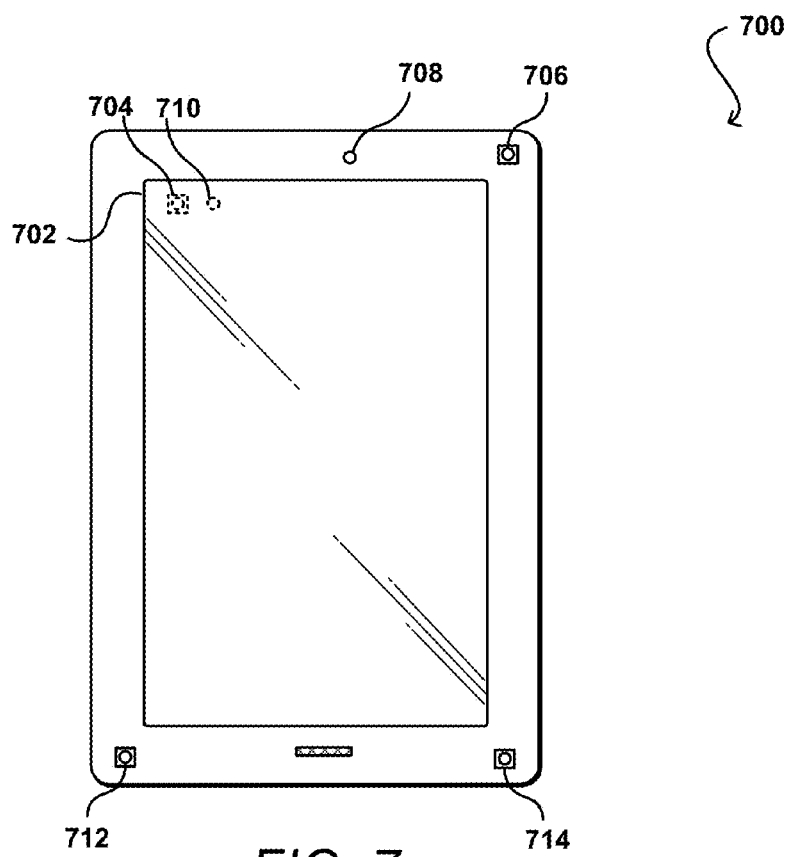
FIG. 7 illustrates an example computing device that can be used in accordance with various embodiments.

FIG. 7 illustrates an example computing device 700 that can be used to perform methods in accordance with various embodiments discussed and suggested herein. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display element 702 (e.g., an LCD element) operable to display information or image content to one or more users or viewers of the device. The display screen of some embodiments displays information to the viewers facing the display screen (e.g., on the same side of the computing device as the display screen). In this example, the device has four image capture elements 704, 706, 712, 714 positioned at various locations on the same side of the device as the display element 702, enabling the device to capture image information about a user of the device during typical operation where the user is at least partially in front of the display element. It should be understood, however, that image capture elements could also, or alternatively, be placed on the sides, corners, or back of the device, and that there can be any appropriate number of capture elements of similar or different types. Each image capture element and may be, for example, a camera, a charge-coupled device (CCD), a motion detection sensor or an infrared sensor, or other image capturing technology. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 708 is included that can be used to determine an amount of light in a general direction of objects to be captured and at least one illumination element 710, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. Various other elements and combinations of elements can be used as well within the scope of the various embodiments as should be apparent in light of the teachings and suggestions contained herein.

Figure 8:
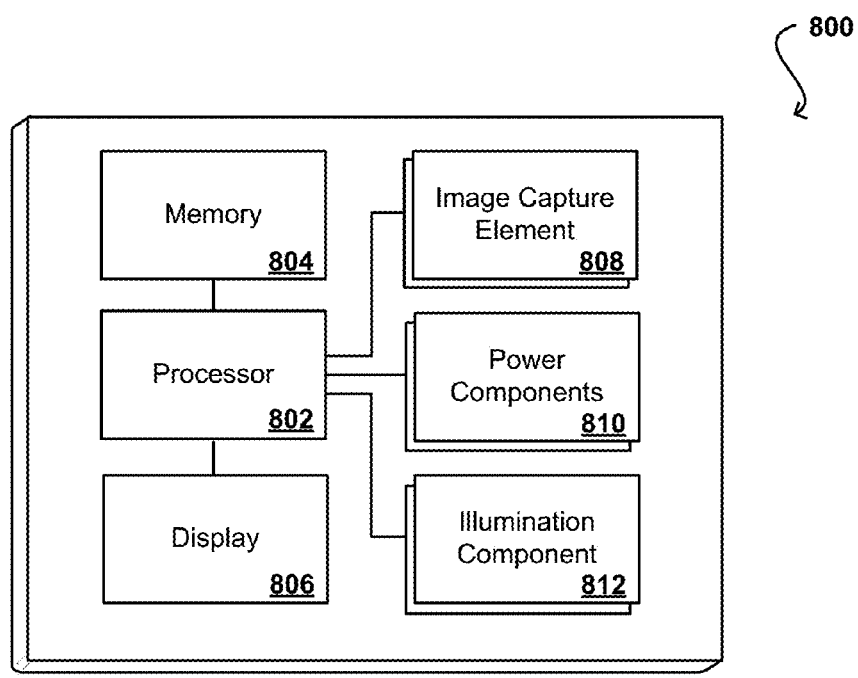
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or non-transitory computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The device also includes a power system 810, such as may include a battery operable to be recharged through conventional plug-in approaches, or through other approaches such as capacitive charging through proximity with a power mat or other such device. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a light source;
   a camera;
   a cover sheet that includes a light filtering feature, the light filtering feature including a scattering pattern, wherein the scattering pattern includes at least one diffraction pattern formed at a predetermined angle relative to a light source, and wherein a first diffraction pattern includes a first set of diffraction features at a first angle and a second diffraction pattern includes a second set of diffraction features at a second angle, the second angle different from the first angle; and
   a memory device including instructions that, when executed by the at least one processor, cause the light source to emit light in a first direction through the cover sheet, the instructions when executed further causing the camera to detect a subset of the light transmitted in a second direction through the cover sheet, wherein the second direction is substantially opposite to the first direction,
   wherein the light source and the camera are positioned on a same side of the cover sheet, and wherein the scattering pattern is positioned to scatter the subset of the light reflected by the cover sheet in the second direction toward the camera, to reduce an amount of the subset of the light detected by the camera.

2. The computing device of claim 1, wherein the scattering pattern includes a plurality of overlapping refractive features configured to scatter light reflected by the cover sheet, and wherein the plurality of proximate to overlapping features include at least one of, spheres, circles, or bubbles formed into a substantially planar pattern orthogonal to a plane of a top surface of the cover sheet.

3. The computing device of claim 1, wherein the scattering pattern is formed in the cover sheet using at least one laser, the at least one laser having a predetermined pulse length.

4. A system, comprising:
   a cover sheet that includes a light filtering feature, the light filtering feature including a scattering pattern, wherein the scattering pattern includes at least one diffraction pattern formed at a predetermined angle relative to the light source, and wherein a first diffraction pattern includes a first set of diffraction features at a first angle and a second diffraction pattern includes a second set of diffraction features at a second angle, the second angle different from the first angle;
   a light source positioned to project light in a first direction through the cover sheet; and
   a sensor positioned to receive a subset of the light passing back in a second direction substantially opposite the first direction,
   wherein the scattering pattern is positioned to scatter the subset of the light reflected by the cover sheet in the second direction toward the sensor, to prevent at least a portion of the subset of the light from being detected by the sensor.

5. The system of claim 4, wherein the scattering pattern includes one or more overlapping refractive features, and wherein the one or more overlapping refractive features are formed into a substantially planar pattern orthogonal to a plane of a top surface of the cover sheet.

6. The system of claim 4, wherein the scattering pattern includes one or more refractive features separated by at least a predetermined amount.

7. The system of claim 4, wherein at least one of a spacing of one or more diffraction features or a density of the one or more diffraction features of the at least one diffraction pattern is based at least in part on a wavelength of the light from the light source.

8. The system of claim 4, wherein the light filtering feature includes a blocking feature, and wherein a subset of light reflected by a portion of the cover sheet towards the sensor is blocked by the blocking feature to prevent the subset of light from reaching the sensor.

9. The system of claim 4, wherein the sensor is one of a camera, a charge-coupled device (CCD), a metal oxide semiconductor device (CMOS), a motion detection sensor or an infrared sensor, or other image capturing technology, and wherein the light source is at least one of a light emitting diode (LED) or a white flash.

10. The system of claim 4, wherein the light filtering feature is formed into the cover sheet using at least one laser, the at least one laser having a predetermined pulse length.

11. A method of forming a partially transmissive layer in a cover sheet, comprising:
    forming the cover sheet for a computing device;
    determining a first location of a light source and a second location of a sensor when the cover sheet is installed on the computing device, the light source in the first location being positioned to project light in a first direction through the cover sheet, the sensor in the second location being positioned to receive a subset of the light passing back in a second direction substantially opposite the first direction; and
    forming into the cover sheet at least one light filtering feature, the light filtering feature including a scattering pattern positioned to scatter the subset of the light reflected by the cover sheet in the second direction towards the second location, to prevent at least a portion of the subset of the light from being detected by the sensor,
    wherein the scattering pattern includes at least one diffraction pattern formed at a predetermined angle relative to the light source, and wherein a first diffraction pattern includes a first set of diffraction features at a first angle and a second diffraction pattern includes a second set of diffraction features at a second angle, the second angle different from the first angle.

12. The method of claim 11, wherein the at least one light filtering feature includes at least one scattering pattern formed in the cover sheet, and wherein the at least one scattering pattern is formed into the cover sheet using a laser.

13. The method of claim 12, wherein the scattering pattern includes one or more refractive features formed into the cover sheet using the laser, the laser having a predetermined pulse length, and wherein the one or more refractive features includes at least one of a circle, a dot, a sphere, or one or more gratings.

14. The method of claim 12, wherein the laser includes at least one of a green diode-pump solid state (DPSS) laser, an ultra violet (UV) laser, or an infrared laser.

15. The method of claim 11, wherein forming the at least one light filtering feature includes using a laser to modify a refractive index of the cover sheet at one or more particular locations in the cover sheet.

16. The method of claim 11, wherein forming the at least one light filtering feature includes using a laser to create one or more physical defects in the cover sheet to cause a change in a refractive index of the cover sheet.

17. The method of claim 11, wherein the at least one light filtering feature includes a blocking feature, and wherein a subset of light from the light source reflected by a portion of the cover sheet towards the sensor is blocked by the blocking feature to prevent the subset of light from reaching the sensor.

18. The method of claim 17, wherein the blocking feature is inserted between a first piece of the cover sheet and a second piece of the cover sheet, at least a top surface of the first piece of the cover sheet and a top surface of the second piece of the cover sheet being fused together.

\* \* \* \* \*